US011220618B2

(12) United States Patent
Trom et al.

(10) Patent No.: US 11,220,618 B2
(45) Date of Patent: Jan. 11, 2022

(54) AMORPHOUS SILICA PARTICLES AND METHODS OF PRODUCING AMORPHOUS SILICA PARTICLES

(71) Applicant: Xaris Holdings, LLC, Spring, TX (US)

(72) Inventors: Scott D. Trom, Spring, TX (US); Bernard G. Pike, Richmond, VA (US)

(73) Assignee: Xaris Holdings, LLC, Spring, TX (US)

( * ) Notice: Subject to any disclaimer, the term of this patent is extended or adjusted under 35 U.S.C. 154(b) by 4 days.

(21) Appl. No.: 16/255,302

(22) Filed: Jan. 23, 2019

(65) Prior Publication Data
US 2019/0225851 A1 Jul. 25, 2019

Related U.S. Application Data

(60) Provisional application No. 62/620,570, filed on Jan. 23, 2018.

(51) Int. Cl.
| | |
|---|---|
| *C09K 3/14* | (2006.01) |
| *C03C 3/076* | (2006.01) |
| *B24C 11/00* | (2006.01) |
| *C03C 3/078* | (2006.01) |
| *C03C 3/083* | (2006.01) |
| *C03C 12/00* | (2006.01) |
| *C03B 1/00* | (2006.01) |

(52) U.S. Cl.
CPC ............ *C09K 3/1427* (2013.01); *B24C 11/00* (2013.01); *C03B 1/00* (2013.01); *C03C 3/076* (2013.01); *C03C 3/078* (2013.01); *C03C 3/083* (2013.01); *C03C 12/00* (2013.01)

(58) Field of Classification Search
CPC ..... C03B 19/107; C03B 19/109; C03B 5/005; C03B 5/031; C03B 5/193; C03B 5/2356; C03C 11/002; C03C 1/002; C03C 3/076; C03C 3/078; C03C 3/083; C04B 14/24; C08K 7/28; C22C 32/001; C09K 8/80; C09K 8/805; C09K 3/1427; B24C 11/00
See application file for complete search history.

(56) References Cited

U.S. PATENT DOCUMENTS

| | | | |
|---|---|---|---|
| 3,166,430 A | 1/1965 | Seabright | |
| 5,810,922 A | 9/1998 | Okamoto et al. | |
| 5,830,251 A | 11/1998 | Simpson et al. | |
| 2002/0004111 A1* | 1/2002 | Matsubara | C03C 3/091 |
| | | | 428/34.4 |
| 2002/0176931 A1* | 11/2002 | Goseki | G03G 15/0894 |
| | | | 427/140 |
| 2003/0090800 A1* | 5/2003 | Humpal | G02B 5/128 |
| | | | 359/551 |
| 2004/0251329 A1* | 12/2004 | Hsu | C09D 17/001 |
| | | | 241/15 |
| 2008/0087136 A1 | 4/2008 | Ek | |
| 2010/0162757 A1 | 7/2010 | Brodie | |
| 2012/0192764 A1 | 8/2012 | Attridge et al. | |
| 2014/0038859 A1* | 2/2014 | Skala | C04B 35/195 |
| | | | 507/269 |
| 2014/0371116 A1* | 12/2014 | Hojaji | C03C 11/002 |
| | | | 507/269 |
| 2016/0376199 A1 | 12/2016 | Koep et al. | |
| 2017/0226006 A1* | 8/2017 | Ito | C03C 19/00 |
| 2019/0225851 A1 | 7/2019 | Trom et al. | |

FOREIGN PATENT DOCUMENTS

EP  2966044 A1  1/2016

OTHER PUBLICATIONS

International Search Report and Written Opinion received for International PCT Application No. PCT/US2019/014766, dated Jul. 9, 2019, 21 Pages.

Karamanov et al. "Vitrification of copper flotation waste". Journal of Hazardous Materials, vol. 140, No. 1-2, p. 333-339, Feb. 9, 2007. DOI:10.1016/j.jhazmat.2006.09.040.

International Search Report and Written Opinion received for International PCT Application No. PCT/US2020/47610, dated Nov. 20, 2020, 34 Pages.

\* cited by examiner

*Primary Examiner* — Pegah Parvini

(74) *Attorney, Agent, or Firm* — Bernard G. Pike; Pike IP Law

(57) ABSTRACT

An amorphous silica particles, gravel, other particles and products provide a safe replacement for crystalline silica sand, gravel, or particles in consumer and industrial applications wherein dust may be produced during use or installation. The amorphous silica particles, gravel, other particles or products may comprise components that increase the density, hardness, and other properties from container glass. These components include, but are not limited to, iron oxides, aluminum oxides, and zirconium oxides.

15 Claims, No Drawings

AMORPHOUS SILICA PARTICLES AND METHODS OF PRODUCING AMORPHOUS SILICA PARTICLES

RELATED APPLICATION

This application claims priority to U.S. provisional patent application No. 62/620,570 filed on Jan. 23, 2018 which is hereby incorporated by reference.

TECHNICAL FIELD

Embodiments of the method of invention comprise producing amorphous silica glass particles directly from natural crystalline silica sand. Natural silica sand is comprised almost entirely of the crystalline form of the silica. However, airborne crystalline silica has been determined to be a hazardous substance that has been shown to cause silicosis if inhaled.

Embodiments of a method include heating crystalline silica sand, gravel, or other particles to a temperature in which the crystalline silica is converted into amorphous silica sand, gravel, or other particles. The amorphous silica particles, gravel, or other particles may be used as a safe replacement for crystalline silica sand, gravel, or particles in consumer and industrial applications wherein dust may be produced during use or installation, for example.

In another embodiment, the crystalline silica sand may be heated in the presence of fluxing components, density increasing components, hardness increasing components and other property enhancing components. The density increasing components may be aluminum oxide, zirconium oxide, clays comprising aluminum oxide, zirconium oxide, or a combination of aluminum oxide, iron oxide, and zirconium oxide. Other density increasing components include titanium oxide and other transition metal oxides.

In a still further embodiment, an enhanced glass product may be produced. The

Thermal (fuse or melt) processing of crystalline-silica containing minerals (comprising quartz sands and heavy mineral sands) and, optionally, recycled glass streams assure the conversion of their crystalline silica content into amorphous silica sands, gravel, or other particles and, also, kills any microbes present in the feed streams. Therefore, the amorphous silica products are microbe free.

Embodiments also include products produced from the amorphous silica sand, gravel or other particles. For example, embodiments of the products include crystalline silica free sand, gravel, cullet, blasting abrasives, concrete mixes, grout, manufactured stone, mortar, bricks, concrete blocks, other concrete products, pavers, and other products that would benefit and safer with the replacement of crystalline silica with amorphous silica. The amorphous silica products may be a direct replacement for the crystalline silica products.

BACKGROUND

Crystalline silica is the most abundant mineral on earth. Due to its abundance and low cost, crystalline silica sand, gravel, and rocks have been used for many industrial and consumer applications, including hydraulic fracturing sand, glass production, foundry sand, building materials, sand blasting, recreational sand, as well as other uses. Gravel or coarse aggregate shall herein be defined as any aggregate larger than about 3/16 of an inch. Sand or fine aggregate is defined as any aggregate less than about 3/16 of inch with silt being considered the smallest particles.

However, it has been found that airborne particles of crystalline silica sand may enter the lungs of people in and around any area. Crystalline silica sand in the lungs may result in the development of silicosis and a host of other illnesses. Silicosis is one of the world's oldest known occupational diseases, with reports of employees contracting the disease dating back to ancient Greece.

Airborne crystalline silica dust may be produced during the manufacturing process of the crystalline silica products and also during use or installation of the crystalline silica products. For example, crystalline silica dust becomes airborne, such as during blasting with sand and cutting concrete or bricks, for example.

Abrasive blasting uses compressed air or water to direct a high velocity stream of an abrasive material to clean an object or surface, remove burrs, apply a texture or prepare a surface for painting. Abrasive blasting is more commonly known as sandblasting since silica sand is commonly used as the abrasive, although not the only one always used. Industries that rely on sandblasting on a daily or regular basis include painting who work on large structures like bridges, granite monument makers, foundries and shipbuilders. Industries that rely on sandblasting on a daily or regular basis include any one doing surface preparation work or restoration on large structures like bridges, tanks, pipelines, heavy equipment, shipbuilders, or concrete restoration.

The term "silica" broadly refers to the mineral compound silicon dioxide ($SiO2$). Although silica can be crystalline or amorphous in form, only the natural crystalline form of silica is hazardous to users that may inhale crystalline silica dust. Owing to its abundance, unique physical and chemical properties, crystalline silica has many uses. Common, commercially produced silica products include quartzite, tripoli, gannister, chert, and novaculite. Crystalline silica also occurs in nature as agate, amethyst, chalcedony, cristobalite, flint, quartz, tridymite, and, in its most common form, silica sand.

Silica sand has been used for many products throughout human history, but one of its most common use is in the production of glass. Table 1-1 summarizes other uses for sand and gravel. In some instances, grinding of sand, gravel, or products containing crystalline silica sand or gravel is required, producing and increasing levels of dust containing hazardous respirable crystalline silica.

TABLE 1

Typical uses of silica sand and gravel

| Product | Major End Use |
|---|---|
| Sand | |
| Glass Making | Containers, flat (plate and window), specialty, fiberglass (un-ground or ground) |
| Foundry | Molding and core, molding and core facing (ground) refractory |
| Metallurgical | Silicon carbide, flux for metal smelting |

TABLE 1-continued

Typical uses of silica sand and gravel

| Product | Major End Use |
| --- | --- |
| Abrasives | Blasting, scouring cleansers (ground), sawing and sanding, chemicals (ground and unground) |
| Fillers | Rubber, paints, putty, whole grain fillers/building products |
| Ceramic | Pottery, brick, tile, and refractory ceramics |
| Filtration | Water (municipal, county, local), swimming pool, others |
| Petroleum industry | Hydraulic fracturing, well packing, and cementing |
| Recreational | Golf courses, baseball, volleyball, play sands, beaches, traction (engine), roofing granules and fillers, other (ground silica or whole grain) |
| Gravel | Silica, ferrosilicon, filtration, nonmetallurgical flux, other |

In March 2016, the Occupational Safety and Health Administration (OSHA) issued a final rule to requiring companies to control exposure to respirable crystalline silica. The rule is comprised of two standards: one for Construction (29 Code of Federal Regulations (CFR) 1926.1153) and the other for General Industry (29 CFR 1910.1053) and Maritime (29 CFR 1915.1053). The Maritime and General Industry standards are the similar, but differ from the Construction standard. The General Industry/Maritime Standard requires the employer to perform air monitoring to determine the eight-hour average exposure level for each affected job task. Employers governed by the Construction standard can either use a control method spelled out for common construction work tasks or perform air monitoring as detailed in the General Industry/Maritime standard.

These requirements can be expensive to implement. To use crystalline silica in the workplace, worker protective measures need to be taken. Initially, airborne crystalline silica sampling needs to be conducted. Once collected, the samples are sent to a laboratory for analysis. The results of this analysis will determine if improved ventilation and/or a change in work practices or respiratory protection is needed.

The new action limit and permissible exposure limit (PEL) for crystalline silica for General Industry, Construction and Maritime are all the same and can be found in Construction (29 CFR 1926.1153), General Industry (29 CFR 1910.1053) or Maritime (29 CFR 1915.1053). The action limit is established at 25 micrograms per cubic meter (ug/m3) and the PEL is established at 50 ug/m3.

To help control the risk of respirable crystalline silica exposure, OSHA's "three lines of defense" philosophy is suggested. The first line of defense is to eliminate and/or engineer the crystalline silica exposure hazard out. This may be best performed by removing the crystalline silica from the workplace. When engineering/elimination controls are not feasible or practical, the second and third lines of defense can be used to help control the crystalline silica exposure hazard. The second line of defense is administrative controls, and the last line of defense to be considered is personal protective equipment (PPE).

OSHA recommends the first engineering control to consider is substitution of the crystalline silica with a nonhazardous product. OSHA suggests using a less toxic abrasive blasting media that can be delivered with water to reduce dust generation. This creates the need for a suitable substitution for the crystalline silica.

The advantages of using a silica substitute outweigh using silica in abrasive sandblasting due to the hazards and compliance with the regulations. The health issues and healthcare costs related to silica would be greatly reduced or eliminated. The time and cost of implementing and maintaining engineering controls would also be eliminated. The disadvantages are that the existing substitutes may not be as hard as a crystalline silica abrasive, nor as dense. Therefore, more of the substitute may need to be used to achieve the same result. It may also be more expensive.

There is a need for a safe substitute for crystalline silica products that do not cause silicosis and do not require strict engineering controls for safe use. There is a further need for an inexpensive, effective amorphous silica sand and amorphous silica gravel for commercial and residential products, including for use as a blasting medium. There is a further need for a water-soluble amorphous silica product.

SUMMARY

Embodiments of the amorphous silica products comprise higher concentrations of metal oxides, such as, but not limited to, iron oxide, alumina, and zirconia, for example. The concentrations of metal oxides result in an amorphous silica product with a density and hardness above the density and hardness amorphous silica or typical recycled glass. The amorphous silica product may be substantially free of deleterious levels of toxic or heavy metals. As used herein, the term "substantially free of deleterious levels of toxic or heavy metals" means that the environmental and industrial hygiene organizations do not consider the amorphous silica product toxic if used as intended.

An embodiment of an amorphous silica product for use as an abrasives, proppants, and sand/sanded products such as, but not limited to, grouts, mortars and concrete, for example, may comprise silicon oxide in the range of 56 wt. % to 80 wt. %, iron oxides in the range of 5 wt. % to 35 wt. %, aluminum oxides in the range of 0 wt. % to 8 wt. %, zirconium oxides in the range of 0 wt. % to 5 wt. %, and modifiers in the range of 0 wt. % to 10 wt. %. Embodiments of the amorphous silica products including the abrasives, proppants, and sand/sanded products may require the amorphous silica products to be ground to particles. Therefore, embodiments of the amorphous silica products are particles that have been classified into particle size ranges. The embodiments include particles that have a bulk composition consisting essentially of silicon oxide in the range of 56 wt. % to 80 wt. %, iron oxides in the range of 5 wt. % to 35 wt. %, aluminum oxides in the range of 0 wt. % to 8 wt. %, zirconium oxides in the range of 0 wt. % to 5 wt. %, and modifiers in the range of 0 wt. % to 10 wt. %.

The oxides may comprise oxides in multiple forms or valences such as ferric and ferrous oxides. The glass batches may be melted comprising various form of the metals such as oxides or silicates, for example, but the amorphous silica product is reported as oxides.

The density of embodiments of certain embodiments of the amorphous silica products is correlated with increasing concentrations of metal oxides including but not limited to, iron oxides, zirconium oxides, aluminum oxides, and combinations thereof, for example. Embodiments of the amorphous silica products may have a density in the range of 2.5 g/cc to 3.5 g/cc. Embodiments with higher concentrations of iron oxide and/or other metal oxides may have a density in the range of 2.8 g/cc to 3.5 g/cc.

An embodiment of an amorphous silica product for use as abrasives, proppants, and sand/sanded products such as, but not limited to, grouts, mortars and concrete, for example, may comprise silicon oxide in the range of 56 wt. % to 80 wt. %, iron oxides in the range of 10 wt. % to 45 wt. %, aluminum oxides in the range of 0 wt. % to 8 wt. %, zirconium oxides in the range of 0 wt. % to 5 wt. %, and modifiers in the range of 0 wt. % to 10 wt. %. The modifier may be typical fluxes used in glass manufacturing, for example. The embodiments of the amorphous silica product for use as abrasives, proppants, and sand/sanded products may be crushed and classified into particle size ranges. Abrasives, proppants and sands/sanded products are typically classified into different particle size ranges based upon the intended application.

Further, the hardness of embodiments of the amorphous silica product is correlated with increasing iron oxides, zirconium oxides, aluminum oxides, and combinations thereof. Embodiments of the amorphous silica product have a Knoop hardness in the range of 615 Hk to 850 Hk. Embodiments with higher concentrations of the metal oxides may have a Knoop hardness in the range of 750 Hk to 850 Hk.

Certain embodiments of the method comprise converting sand, gravel, other minerals and rock naturally comprise converting crystalline or polycrystalline silica (hereinafter, "crystalline silica") to an amorphous glass sand or gravel. For example, the crystalline silica sand, gravel, other particles, and/or mineral include, but are not limited to, silica sand, silica gravel, quartz sand, any type of heavy mineral sand including garnet, staurolite, and olivine, for example. The amorphous glass sand or gravel may be used in or converted to the commercial and residential applications as described herein.

Embodiments of the method of producing amorphous silica sand or other products comprises converting material comprising crystalline silica into an amorphous glass sand or gravel or other amorphous product. The conversion may be performed by heating the crystalline silica to a temperature above the temperature that results in the phase change to an amorphous form of silica. In certain embodiments, this temperature may be above the melting temperature of crystalline silica. The melting point of pure silica dioxide is approximately 3110° F. (1710° C.). The melting point may vary based upon the natural composition of the sand, gravel or other rock.

As stated, the melting point of pure silica dioxide is high relative to other materials and processing may be difficult. The melting point of a glass batch comprising crystalline silicas may be, and typically is, lowered by addition of melting temperature reducing agents (fluxes). Thus, in other embodiments, a glass batch may be prepared by mixing the crystalline silica with a melting point reducing agent.

Further, the density of pure amorphous silica may be too low for some applications, such as for an effective abrasive blasting medium. Abrasive blasting media may generally be classified by their specific gravity and hardness. Some properties of the media will affect the efficiency of abrasives in removing coatings or cleaning surfaces including hardness and density, for example. Generally, the greater the difference in hardness between the abrasive media and the coating to be removed or material to be cleaned, the more efficient the blasting process. Higher density particles may also result in a more efficient blasting process because higher density particles with similar contact velocity as lower density particles of approximately the same size will generally have a greater contact force and, therefore, result in a more efficient stripping or cleaning process.

Additionally, a method of producing a water-soluble amorphous silica sand, gravel, or other particles may comprise mixing at least one flux with the crystalline silica dioxide containing material. Embodiments of the method may comprise mixing a flux or fluxes with the silica dioxide containing material wherein at least one of the flux or fluxes mix with the silica dioxide containing material to increase at least one of the density and the hardness of the resulting amorphous silica product relative to pure amorphous silica or container glass.

Metals and metal oxides may be used as fluxes for crystalline silica dioxide that would result in an amorphous glass product with increased density and/or increased hardness. More conventional glass fluxes may also be added.

Embodiments include abrasive blasting media and methods of producing abrasive blasting media. Embodiments of the method for producing amorphous silica abrasive blasting materials eliminate the step of collecting, cleaning, and classifying recycled or waste glass. As such, embodiments of the process comprise transforming crystalline or polycrystalline sand, gravel, other particles, or rock that comprise crystalline silica into amorphous sand, gravel, other particles, or rock to reduce the concentration of crystalline silica (a known carcinogen) to safer levels when the amorphous silica sand, gravel or other particle is manufactured or used. Thus, embodiments of the method comprise making these products into a more industrial hygiene friendly substitution for naturally occurring products containing various forms of crystalline silica.

In another embodiment, the process for producing amorphous products consists essentially of heating sand and/or a mineral comprising crystalline silica into an amorphous mass, cooling the amorphous mass to a solid, and forming particles comprising amorphous silica. The particles of amorphous silica may be further crushed or otherwise comminuted to reduce the size of the particles or produce particles having a narrower particle size distribution, for example.

An embodiment of the amorphous silica product or abrasive blasting media comprises silicon oxide in the range of 50 wt. % to 75 wt. %, metals or metal oxides in the range of 20 wt. % to 45 wt. %, and other fluxing compounds in the range of 0 to 10 wt. %. In some embodiments, the other flux compounds or fluxing compounds do not include the metal oxides. The metal oxides include, but are not limited to, iron oxides, aluminum oxides, zirconium oxides, titanium oxides, manganese oxides, magnesium oxides, and combinations thereof. The metal oxides may be added from clays, rock, and/or minerals containing silicates, oxides, or other forms of these metals.

Metals may also be added in their pure metal form or as an alloy. The metals include, but are not limited to, iron, aluminum, titanium, zirconium, manganese, magnesium, alloys and combinations thereof. The metals may be melted in a furnace in the presence of oxygen to at least partially form oxides or in a furnace with an inert atmosphere to melt directly into the amorphous silica.

For example, an embodiment of the amorphous silica product or abrasive blasting media comprises silicon oxide in the range of 50 wt. % to 75 wt. %, iron oxides in the range of 15 wt. % to 45 wt. %, and other fluxing compounds in the range of 0 to 10 wt. %. To further reduce the melting point, the other fluxes may be in the range of 1 wt. % to 10 wt. %. This embodiment of the amorphous silica product may comprise aluminum oxides in the range of 0.5 wt. % to 10 wt. %, zirconium oxides in the range of 0.5 wt. % to 10 wt. %, or a combination thereof.

The fluxing compounds may include any fluxes typically used in glass manufacturing and may include, but are not limited to, sodium oxides, calcium oxides, magnesium oxides, potassium oxides, lithium oxides, boric oxides, and combinations thereof.

In some embodiments, the amorphous silica product or abrasive blasting media may comprise a ratio of Si to Fe in the amorphous silica product or abrasive blasting media is in the range of 3:4 to 4:1. Other embodiments, the ratio of Si to Fe in the range of 3:4 to 3:1. In other embodiments, the amorphous silica product may comprise a ratio of Si to the total of Fe and Al in the range of 3:4 to 3:1. In another embodiments, the amorphous silica product may comprise a ratio of Si to the total of Fe and Zr in the range of 3:4 to 3:1. In another embodiments, the amorphous silica product may comprise a ratio of Si to the total of Fe, Zr, and Al in the range of 3:4 to 3:1.

In a still further embodiment of the amorphous silica product or abrasive blasting media comprises silicon oxide in the range of 50 wt. % to 75 wt. %, iron oxides in the range of 25 wt. % to 55 wt. %, and other fluxing compounds in the range of 0 to 10 wt. %. To further reduce the melting point, the other fluxes may be in the range of 1 wt. % to 10 wt. %. This embodiment of the amorphous silica product may comprise aluminum oxides in the range of 0.5 wt. % to 10 wt. %, zirconium oxides in the range of 0.5 wt. % to 10 wt. %, or a combination thereof to produce the desired properties.

In another embodiment of the amorphous silica product or abrasive blasting media comprises silicon oxide in the range of 50 wt. % to 75 wt. %, a combination of iron oxides and one of aluminum oxides, zirconium oxides, or a combination of aluminum oxides and zirconium oxides in the range of 25 wt. % to 60 wt. %, and other fluxing compounds in the range of 0 to 15 wt. %. To further reduce the melting point, the other fluxes may be in the range of 1 wt. % to 15 wt. %.

Another embodiment is directed to an amorphous silica product or an abrasive blasting media consisting essentially of silicon oxide in the range of 50 wt. % to 75 wt. %, iron oxides in the range of 20 wt. % to 40 wt. %; and fluxing compounds in the range of 0 to 15 wt. %.

Embodiments of the method are directed to a method of producing a glass product comprising preparing a melt batch, wherein the melt batch comprises silicon oxide in the range of 55 wt. % to 75 wt. %, at least one of iron, iron silicates, and iron oxides in the range of 18 wt. % to 45 wt. %, and flux or fluxes in the range of 0 wt. % to 20 wt. %. The melt batch is heated to melt the components a glass melt and cooling the glass melt. Cooling the glass melt may comprise quenching the glass melt, air cooling the glass melt, annealing the glass melt or combinations thereof.

In any embodiment, the melt batch consists essentially of silicon oxide in the range of 55 wt. % to 75 wt. %, at least one of iron, iron silicates, and iron oxides in the range of 18 wt. % to 45 wt. %, and other flux components in the range of 0.5 wt. % to 10 wt. %.

A still other embodiment of the amorphous silica product or the abrasive blasting media comprises silicon oxide in the range of 45 wt. % to 75 wt. %, iron oxides in the range of 25 wt. % to 45 wt. %, and fluxing compounds in the range of 0 to 10 wt. %. In some embodiments, the amorphous silica product or abrasive blasting media consists essentially of silicon oxide in the range of 45 wt. % to 75 wt. %, iron oxides in the range of 28 wt. % to 45 wt. %, and fluxing compounds in the range of 0 to 10 wt. %.

An abrasive blasting media comprising or, in some cases consisting essentially of, silicon oxide in the range of 50 wt. % to 75 wt. %, iron oxides and aluminum oxides, wherein the iron oxides and the aluminum oxides together are in in the range of 5 wt. % to 50 wt. %, and fluxing compounds in the range of 0 to 10 wt. %. For this embodiment, the abrasive blasting media may comprise the aluminum oxides in the range of 3 to 10 wt. %.

An abrasive blasting media comprising or, in some cases consisting essentially of, silicon oxide in the range of 50 wt. % to 75 wt. %, iron oxides and aluminum oxides, wherein the iron oxides and the aluminum oxides together are in in the range of 25 wt. % to 50 wt. %, and fluxing compounds in the range of 0 to 10 wt. %. Also, for this embodiment, the abrasive blasting media may comprise the aluminum oxides in the range of 3 to 10 wt. %.

The amorphous silica product or the abrasive blasting media may comprise, or consist essentially of, silicon oxide in the range of 50 wt. % to 75 wt. %, iron oxides and zirconium oxides, wherein the iron oxides and the zirconium oxides together are in in the range of 12 wt. % to 50 wt. %, and fluxing compounds in the range of 0 to 10 wt. %. For this embodiment, the zirconium oxides are in the range of 2 to 10 wt. %.

The amorphous silica product or the abrasive blasting media may comprise, or consist essentially of, silicon oxide in the range of 50 wt. % to 75 wt. %, iron oxides and zirconium oxides, wherein the iron oxides and the zirconium oxides together are in in the range of 25 wt. % to 50 wt. %, and fluxing compounds in the range of 0 to 10 wt. %. For this embodiment, the zirconium oxides are in the range of 2 to 14 wt. %.

In a still other embodiment, an amorphous silica product or abrasive blasting media consists essentially of silicon oxide in the range of 50 wt. % to 75 wt. %, iron oxides in the range of 20 wt. % to 45 wt. %, and fluxing compounds in the range of 4 to 20 wt. %.

Embodiments also include methods of producing an amorphous silica product or abrasive media. The method may comprise preparing a melt composition. Melt compositions of various compositions may be prepared. One embodiment of the melt composition comprises 50 wt. % to 75 wt. % of silicon oxides, 12 wt. % to 40 wt. % of iron oxide, and 4 wt. % to 20 wt. % of at least one flux component. The melt composition may be referred to as a "glass batch." The term "glass batch" may refer to the raw materials fed into a batch furnace or a continuous furnace.

Another embodiment of the melt composition comprises 50 wt. % to 75 wt. % of silica, 12 wt. % to 40 wt. % of iron containing material, 4 wt. % to 20 wt. % of at least one flux component. In embodiments, the iron containing material may be at least one of iron oxides, iron silicates, iron filings, or iron containing minerals. In such embodiments, the melt composition comprises 50 wt. % to 75 wt. % of silicon oxide, 10 wt. % to 40 wt. % of iron containing metal filings, and 4 wt. % to 20 wt. % of at least one flux component.

In some embodiments, the melt composition comprises or consists essentially of 40 wt. % to 80 wt. % of cullet and 8 wt. % to 60 wt. % of at least one metal oxide. In these embodiments, the metal oxide may be at least one of iron oxide, aluminum oxide, zirconium oxide, titanium oxide, magnesium oxide. The metal oxides may be added individually, in alloys, or minerals comprising these metal oxides. As used herein, the term "cullet" includes both process cullet and postconsumer cullet.

Further embodiments of the method of forming an amorphous silica product or abrasive comprise preparing a melt composition, wherein the melt composition comprises 50 wt. % to 75 wt. % of silica, 12 wt. % to 40 wt. % of a mix of metal oxides, and 2 wt. % to 20 wt. % of at least one flux component. In this embodiment, the silica may be amorphous silica (cullet, obsidian) or crystalline silica.

The methods may further comprise other glass manufacturing, or frit manufacturing process steps, such as, but not limited to, melting the melt composition in a furnace to form a melt, cooling the melt to form a solid product, crushing or otherwise comminuting the amorphous product to form particles and/or classifying the particles into particle size ranges.

In any embodiment, the silicon oxides may include amorphous or crystalline silicon oxides in the melt composition. The silicon oxides may be cullet, sand, stone, gravel, or other silica containing minerals, for example.

The basic and novel features of the invention are to prepare an amorphous silica product or abrasive blasting media that does not comprise significant concentration of crystalline silica or other toxic compounds for use in industrial, commercial, or residential applications.

In some embodiments, the amorphous silica product may comprise significant amounts of deleterious toxic compounds or heavy metals if they do not cause industrial hygiene problems during manufacture, transport or use.

In another embodiment, the process for producing amorphous products consists essentially of heating sand and/or a mineral comprising crystalline silica into at least one amorphous mass, cooling or allowing the amorphous mass to cool, crushing or otherwise comminuting the size of the amorphous mass into gravel, sand, or silt sized particles, and classifying the sand, gravel, or silt sized particles into a desired particle size distribution for use as an abrasive blasting media or in other products.

In another embodiment, the process for producing amorphous products consists essentially of heating sand and/or a mineral comprising crystalline silica to a temperature between the melting temperature and less than the gob temperature of the glass batch, quenching, cooling or allowing the amorphous mass to cool, reducing the size of into gravel, sand, or silt sized particles, and grading the gravel, sand, or silt sized particles into a desired particle size distribution for use as an abrasive blasting media or in other products.

Embodiments of the method of the present invention may not require the post melt processing steps of glass making such as forming and floating, for example.

As such, embodiments of the method comprise preparing a glass batch comprising crystalline silica, heating the glass batch or melt composition to produce a molten amorphous mass in a furnace, cooling the furnace effluent such as by quenching the amorphous mass in a water bath or spray to produce amorphous silica mass or particles, optionally, further crushing the amorphous silica particles, and, optionally, annealing the amorphous silica particles.

The iron oxides or iron silicates, aluminum oxide or silicates, and/or the zirconium oxides or silicates, for example, may be added to the melt composition or glass batch in the form of various sources including clays and minerals.

The "amorphous sand" or other amorphous silica product could be formed directly into particles by fritting, for example, or formed into larger masses and crushed depending on the preferred method to obtain a commercially viable and advantageous product for various applications.

In certain embodiments, the properties of amorphous silica or sand may be improved for a specific application such as for use as a blasting media. Currently, there is no tailoring of recycled glass for blasting at this time. Since current amorphous silica blasting media was originally produced for a different purpose (container or plate glass), the properties have not been tailored as a blasting media. The amorphous silica blasting media could have the following properties, for example, if possible:

1) Specific gravity higher than crushed glass, for example, over 2.8 (crushed glass is approximately 2.5, crystalline silica sand is approximately 2.6); and 2) Hardness (mohs scale) approaching 7.0 to 7.5 (crushed glass is 5.5 to 7, crystalline silica sand is approximately 5 to 6) or a Knoop hardness above 650 or in certain embodiments above 680, for example.

At least one embodiment of the blasting media will be water soluble, so stabilizers such as calcium oxide, for example, are not required in certain embodiments as are typically added to the production of container glass and plate glass.

Typical particle sizes for blasting abrasives are in the range of mesh size 20/30, 30/70, and 50/100, for example. These mesh sizes may, typically, include 10% of the particles above or below the stated mesh size range.

Proppants may also be used and sold in various particle size ranges. The typically coarsest standard product for proppant is 20/40. (20/40 particle size means that 90 percent of the proppant product is small enough to pass through the 20 mesh screen having an opening of 0.85 mm) and large enough for greater than 90% of the particles to be retained on the 40 mesh screen (0.425 mm). Each product allows for a distribution of grain sizes within the range. Other standard proppant sizes are 30/50, 40/70, and 50/140 and are similarly defined. Embodiments of the proppants have particle sizes in the range of 20 to 140 mesh, further embodiments, include proppants having particles in the following particle size ranges 20/40, 30/50, 40/70, and 50/140. Further, embodiments of the method comprise melting the glass batch, crushing the amorphous solid, and classifying the particles in particle size range appropriate for use as a proppant. The particle size ranges appropriate for use as a proppant include, but are not limited to, 20/24, 30/50, 40/70, and 50/140, for example.

In further embodiments, appearance and opacity would not matter as much as in a blasting material as in container or plate glass. Embodiments of the amorphous silica products may not have any transparency or clarity restrictions. Constituents added to the batch to reach these properties may make the glass opaque, ugly or unable to be formed by traditional glass methods, for example.

Embodiments of the amorphous silica products should have no significant amounts of toxic components at sufficient quantities that would create inhalation hazards if used where human contact or inhalation is expected. Blasting media comprising iron oxides have shown low toxicity in testing. In contrast to the other abrasive blasting agents, for example, the major component of specular hematite is iron oxide and specular hematite produced no significant alterations in BAL levels of LDH, numbers of lung PMN, macrophage chemiluminescence, the amount of pulmonary hydroxyproline, or fibrotic score. (Barnes Environmental, Inc., 1996). These findings are consistent with the low toxicity of iron oxide in most rat studies (Stokinger, 1984). A recent study in humans also suggests that the initial inflammation associated with intrapulmonary instillation of iron oxide resolves rapidly after exposure (Lay et al., 1999).

The glass batch and/or crystalline silica sand or rock need only be converted to an amorphous silica, not fully melted. The cooling and crushing processes may be designed for economy, to deliver the desired properties, and to provide ease with the production of sand sized particles in the desired particle size ranges. Embodiments of the process to produce amorphous glass products may be summarized as an efficient method of producing crushed, recycled glass particles with higher density and improved hardness directly from crystalline silica materials for the same cost as recycle glass or from cullet to enhance the properties for specific applications.

The production of a relatively high iron amorphous mineraloid can be performed without more rigorous processes such as found in the production of soda lime glass. Embodiments of the method of forming the amorphous silica product may not require fining/viscosity reduction or annealing of container or flat glass.

As stated, the method may further comprise melting glass cullet in combination with property enhancing components. The property enhancing components may comprise iron oxides, iron silicates, other materials comprising iron, aluminum oxide, aluminum silicates, and other materials comprising aluminum, zirconium oxide, zirconium, silicates and/or other materials comprising zirconium to produce an enhanced amorphous silica product. The property enhancing components may provide an amorphous silica product with higher hardness and/or higher density that typical recycled glass or glass cullet.

In a typical glass process, the silica does not melt but is solubilized in the flux such as the melted sodium carbonate. Embodiments of the process include replacing at least a portion of the calcium oxide (or calcium carbonate) and the sodium carbonate in container glass with iron, aluminum or similar materials as fluxes. The iron can come from clays or iron oxides and the aluminum can come from aluminum oxide which is abundant and cheap. There are aluminum silicates that also include iron that may be added.

Embodiments of the method do not comprise or can eliminate the fining process step of container glass making and, further, may not need to completely melt the components as iron or other particles, bubbles, etc. are not detrimental to the product. Frit furnaces do not include'a fining process, for example.

Embodiments of the invention change soda lime glass composition by changing fluxes to enhance density and hardness. Replacing sodium carbonate and calcium carbonate with oxides of iron and alumina, both of which make excellent fluxes, should make a glass oxide product that exhibits higher density and/or hardness than ordinary soda lime glass.

The glass batch and amorphous silica products are defined by their components. However, zirconia (zirconium oxide) may be replaced with zirconia silicate, for example, on a zirconia equivalent substitution. The same molar amount of zirconium silicate may be added to the glass batch or be present in the amorphous silica product to maintain the weight percentage of zirconium. Similarly, aluminum oxide may be substituted for alumina silicate and iron silicate may be substituted for iron oxide.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of components, parts, techniques and steps are disclosed. Each of these has individual benefit and each can also be used in conjunction with one or more, or in some cases, all of the other disclosed embodiments and techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

DESCRIPTION

Embodiments of the invention include abrasive blasting media, proppants, and other amorphous silica products. The other amorphous silica products include, but are not limited to, amorphous silica sands, gravel, or other particles. The abrasive blasting media, proppants, and amorphous silica products may comprise other components that result in products with the beneficial properties for the intended application or improve the processing of the material.

An embodiment of the process comprises heating granules, grains, or particles of sand, minerals, or rock comprising crystalline silica (hereinafter, "crystalline silica") to a temperature where the crystalline silica loses its crystalline structure and is transformed into an amorphous silica. The amorphous silica is then cooled at a sufficient rate to prevent recrystallization and, therefore, produce an amorphous silica sand, gravel, or other particle.

Embodiments of the method comprise heating any type of mineral comprising crystalline silica to a temperature in which the crystalline silica converts to amorphous silica form. The crystalline silica may be mixed with prior to or during the melting process with at least one of melting point reducing agents (fluxes), formers, stabilizers, density increasing components, hardness increasing components, toughness increasing components, or combinations thereof.

Another embodiment of the invention comprises adding additional components to amorphous silica, such as glass or cullet, to form a glass batch and melting the glass batch to incorporate the additional components into the amorphous silica.

A further embodiment of the invention comprises adding recycled glass (cullet) to the crystalline silica sand or mineral and additional components to form the glass batch.

Preparing the Glass Batch or Melt Composition

Embodiments of the method comprise preparing a glass batch. There are three general composition classifications of the glass batches; glass batches comprising crystalline silica, glass batches comprising amorphous silica or cullet, and glass batches comprising a combination of crystalline silica and amorphous silica. The crystalline silica may be obtained from minerals and sands, such as quartz, cristobalite and tridymite.

Crystalline Silica Glass Batches

The crystalline silica may be mixed with additional components, such as, but not limited to, melting point reducing agents (fluxes), formers, stabilizers, density increasing or decreasing components, hardness increasing or decreasing components, toughness increasing components, or combinations thereof, for example.

The melting point of crystalline silica is high at about 1710° C. (3110° F.). Without special equipment such as induction furnaces and specialty materials, it is difficult to directly convert crystalline silica to amorphous silica. However, the melting point may be reduced by addition of at least one melting point reducing agent (flux). In some embodiments, preparing a glass batch comprises mixing the crystalline silica containing material with at least one melting point reducing agent. Reducing the melting point of the glass batch may result in a more efficient process that requires less energy to convert the crystalline silica to amorphous silica. Melting point reducing agents are compounds or elements that lower the temperature or temperature range that the crystalline silica is converted to amorphous silica or melts first and solubilizes the crystalline silica.

In one embodiment, the glass batch may comprise, or consist essentially, of crystalline silica and at least one a metal, a metal oxide or a metal silicate. For example, in one embodiment, the glass batch may comprise crystalline silica in the range of 50 wt. % to 75 wt. % and at least one of iron oxides or iron silicates in the range of 20 wt. % to 45 wt. %. The iron oxide acts as both a flux for the glass batch and to increase the density of the amorphous silica product above the density of a pure amorphous silica or, in some embodiments, above the density of container glass. To further reduce the melting point of the glass batch, the glass batch may comprise additional fluxes. The additional fluxes may be in a range of 0 wt. % to 25 wt. %, for example, or in the range of 0 wt. % to 12 wt. % in other embodiments.

In some cases, such as the addition of bauxite to the glass batch, one component may comprise a combination of the crystalline silica, iron oxides, and additional metal oxides such as aluminum oxide. In an embodiment, the glass batch consists essentially of crystalline silica in the range of 50 wt. % to 75 wt. %, at least one of iron oxides or iron silicates in the range of 20 wt. % to 45 wt. %, and additional fluxes may be in a range of 2 wt. % to 25 wt. %.

For some applications, the glass batch may comprise higher concentrations of iron oxides. In another embodiment, the glass batch may comprise crystalline silica in the range of 50 wt. % to 70 wt. % and at least one of iron oxides or iron silicates in the range of 30 wt. % to 50 wt. %. Again, to further reduce the melting point of the glass batch, the glass batch may further comprise additional fluxes. The additional fluxes may be in a range of 0 wt. % to 25 wt. %, for example, or in the range of 0 wt. % to 10 wt. % in other embodiments. In an embodiment, the glass batch consists essentially of crystalline silica in the range of 50 wt. % to 70 wt. %, at least one of iron oxides or iron silicates in the range of 30 wt. % to 50 wt. %, and additional fluxes may be in a range of 2 wt. % to 25 wt. %.

The composition of the amorphous silica product will be directly related to concentrations of the glass batch except the crystalline silica will be in a predominantly amorphous state. The other components may also be amorphous and reported as oxides.

In another embodiment, the glass batch may comprise crystalline silica in the range of 50 wt. % to 70 wt. %, metal oxides or metal silicates in the range of 30 wt. % to 50 wt. %, and additional fluxes in the range of 0 wt. % to 25wt. %. In another embodiment, the glass batch may comprise crystalline silica in the range of 40 wt. % to 60 wt. %, metals or metal oxides or metal silicates in the range of 30 wt. % to 60 wt. %, and additional fluxes in the range of 2 wt. % to 25wt. %. In some cases, the metal oxides may be a combination of iron oxides with other metals or metal oxides to alter the properties of the amorphous silica product. For example, the metal oxides may be aluminum oxides, zirconium oxides, a combination of aluminum oxides and iron oxides, a combination of zirconium oxides and iron oxides, or a combination of aluminum oxides, zirconium oxides, and iron oxides. Similarly, in some cases, the metal silicates may be a combination of iron silicates with other metals or metal silicates to alter the properties of the amorphous silica products. In some embodiments, the aluminum oxides or aluminum silicates may be present in a range from 0.5 wt. % to 10 wt. %. In some embodiments, the zirconium oxides or silicates may be present in a range of from 0.5 wt. % to 10 wt. %. In some additional embodiments, a combination of aluminum oxides and/or silicates and zirconium oxides and/or silicates may be present in a range of from 0.5 wt. % to 10.

As such, an embodiment of the amorphous silica product comprises amorphous silicon oxide in the range of 50 wt. % to 75 wt. %, a combination of iron oxides and aluminum oxides, wherein the iron oxides and the aluminum oxides together are in in the range of 15 wt. % to 50 wt. %, wherein the aluminum oxides are in a range of 0.5 wt. % to 10 wt. %., and fluxing compounds in the range of 0 to 10 wt. %. In a more specific embodiment, the aluminum oxides may be in the range of 3 to 10 wt. %.

Similarly, an embodiment of the amorphous silica product comprises amorphous silicon oxide in the range of 50 wt. % to 75 wt. %, a combination of iron oxides and zirconium oxides, wherein the iron oxides and the zirconium oxides together are in in the range of 12 wt. % to 50 wt. %, wherein the zirconium oxides are in a range of 0.5 wt. % to 10 wt. %., and fluxing compounds in the range of 0 to 10 wt. %. In a more specific embodiment, the aluminum oxides may be in the range of 0.5 wt. % to 5 wt. %. In either of the above embodiments, the zirconium oxides or the aluminum oxides may be substituted with a combination of aluminum oxides and zirconium oxides.

In one embodiment, the glass batch may comprise silicon oxide in the range of 50 wt. % to 70 wt. %, iron oxides or iron silicates in the range of 27 wt. % to 47 wt. %; and fluxing compounds in the range of 2 to 15 wt. %. In a similar embodiment, the glass batch may consist essentially of silicon oxide in the range of 50 wt. % to 70 wt. %, iron oxides or iron silicates in the range of 27 wt. % to 47 wt. %; and fluxing compounds in the range of 2 to 15 wt. %.

Such embodiments will result in an amorphous silica product comprising silicon oxide in the range of 50 wt. % to 70 wt. % and iron oxides in the range of 27 wt. % to 47 wt. %. Other embodiments of the amorphous silica product or abrasive blasting media will consist essentially of silicon oxide in the range of 50 wt. % to 70 wt. %, iron oxides in the range of 27 wt. % to 47 wt. %, and fluxing compounds in the range of 2 to 15 wt. %.

Amorphous Silica Glass Batch

In one embodiment, the glass batch may comprise or consist essentially of amorphous silica and at least one metal or at least one metal oxide. For example, in one embodiment, the glass batch may comprise amorphous silica in the range of 40 wt. % to 75 wt. %. and metal, metal silicates, and/or metal oxides in the range of 20 wt. % to 45 wt. %. In some embodiments, the metal or metal oxides may be iron oxides, iron silicates, zirconium oxides, zirconium silicates, aluminum oxides, aluminum silicates, or combinations thereof. The other metals and metal oxides described herein may be components of other embodiments of the glass batches.

As in the crystalline silica glass batch, the iron oxide or iron silicates acts as both a flux for the glass batch and to increase the density of the amorphous silica product above the density of a pure amorphous silica. To further reduce the melting point of the glass batch, the glass batch may further comprise additional fluxes. The additional fluxes may be in a range of 0 wt. % to 25 wt. %, for example, or in the range of 0 wt. % to 10 wt. % in other embodiments.

Amorphous silica may be added to the glass batch from various sources. The sources of the amorphous silica may be glass cullet, recycled glass, unprocessed glass waste, partially processed glass waste, diatomaceous earth, or combinations thereof. Glass cullet, recycled glass and other glass waste comprise amorphous silica and other components including fluxes, stabilizers, formers, and colorants, for example. Therefore, the glass batch composition may account for the additional components in the source of the amorphous silica. For example, cullet may comprise fluxes in the range of 10 wt. % to 20 wt. %. If the glass batch comprises 60% glass cullet, the amount of flux added into the glass batch with the cullet will be between 6 wt. % and 12 wt %.

For some applications, the glass batch may comprise higher concentrations of metals, metal silicates, or metal oxides. In another embodiment, the glass batch may comprise amorphous silica in the range of 40 wt. % to 70 wt. % and iron oxides in the range of 30 wt. % to 50 wt. %. Again, to further reduce the melting point of the glass batch, the glass batch may further comprise additional fluxes. The additional fluxes may be in a range of 0 wt. % to 18 wt. %, for example, or in the range of 0 wt. % to 10 wt. % in other embodiments. In an embodiment, the glass batch consists essentially of crystalline silica in the range of 50 wt. % to 70 wt. %, iron oxides in the range of 30 wt. % to 50 wt. %, and additional fluxes may be in a range of 2 wt. % to 20 wt. %.

In another embodiment, the glass batch may comprise a silica in the range of 50 wt. % to 70 wt. %, metals, metal silicates, and/or metal oxides in the range of 30 wt. % to 50 wt. %, and additional fluxes in the range of 0 wt. % to 25 wt. %. In one embodiment, the metals, metal silicates, or metal oxides are iron, iron silicates, or iron oxides. In some additional cases, the metal oxides may be a combination of iron oxides with other metals or metal oxides to alter the properties of the amorphous silica product. For example, the metal oxides may be aluminum oxides, zirconium oxides, a combination of aluminum oxides and iron oxides, a combination of zirconium oxides and iron oxides, or a combination of aluminum oxides, zirconium oxides, and iron oxides. In some embodiments, the aluminum oxides may be present in a range from 0.5 wt. % to 12 wt. %. In some embodiments, the zirconium oxides may be present in a range of from 0.5 wt. % to 12 wt. %. In some additional embodiments, a combination of aluminum oxides and zirconium oxides may be present in a range of from 0.5 wt. % to 10. At least a portion of the metal oxides may be substituted with metal silicates, for example.

As such an embodiment of the amorphous silica product produced from amorphous sources of silica comprise amorphous silicon oxide in the range of 50 wt. % to 75 wt. %, a combination of iron oxides and aluminum oxides, wherein the iron oxides and the aluminum oxides together are in in the range of 15 wt. % to 50 wt. %, wherein the aluminum oxides are in a range of 0.5 wt. % to 10 wt. %, and fluxing compounds in the range of 0 to 10 wt. %. In a more specific embodiment, the aluminum oxides may be in the range of 3 to 10 wt. %.

Similarly, an embodiment of the amorphous silica product comprises amorphous silicon oxide in the range of 50 wt. % to 75 wt. %, a combination of iron oxides and zirconium oxides, wherein the iron oxides and the zirconium oxides together are in in the range of 12 wt. % to 50 wt. %, wherein the zirconium oxides are in a range of 0.5 wt. % to 10 wt. %, and fluxing compounds in the range of 0 to 10 wt. %. In a more specific embodiment, the aluminum oxides may be in the range of 0.5 wt. % to 5 wt. %.

In either of the above embodiments, the zirconium oxides or the aluminum oxides may be substituted with a combination of aluminum oxides and zirconium oxides.

Combinations of Amorphous Silica and Crystalline Silica

In some embodiments, the silica in the glass batch may be a combination of crystalline silica and amorphous silica. In any of the above embodiments, the crystalline silica or the amorphous silica in the glass batch may be replaced with a combination of amorphous silica and crystalline silica in the stated compositional ranges. For example, the glass batch may comprise sand and glass cullet. In other cases, the crystalline silica may be from a crystalline silica mineral, such as the addition of bauxite to the glass batch comprising cullet, the mineral, bauxite for example, may comprise a combination of the crystalline silica, iron oxides, and additional fluxes such as aluminum oxide.

By processing the glass batches in either glass manufacturing methods or frit manufacturing methods, amorphous glass products will be produced. The amorphous glass may be used for any purpose including, but not limited to, abrasive blasting media, proppants, high density amorphous glass product, and other products. Further embodiments of preparing a glass batch may include mixing the crystalline silica sand with recycled glass and/or cullet, if desired.

Heating the Glass Batch to Produce Amorphous Silica Products

Embodiments of the method comprise converting crystalline silica into an amorphous silica produce amorphous silica sand, gravel, or other particles. The method may comprise heating the glass batch comprising crystalline silica to a temperature above the temperature that results in the phase change from the crystalline silica to an amorphous form of silica. The furnace may increase the temperature of the glass batch above the melting temperature of crystalline silica. The melting point of pure silica dioxide is 3110° F. (1710° C.) but may be lowered by addition of fluxes as described above.

Embodiments of the heating the glass batch comprise feeding the glass batch into a glass melting furnace. The furnace may be a continuous or batch furnace. There are various types of glass melting furnaces including pot furnaces (for batch processing), day tank furnaces, gas fired furnaces, and electric furnaces.

In an embodiment comprising a continuous furnace, the glass batch may be heated to and become molten at approximately 1100° C. to 1700° C., more specifically a temperature range 1300° C. to 1600° C., depending upon the composition of the glass batch. In some embodiments of the method, the glass batch may be heated to or above the melt temperature of the glass batch. In another embodiment, the glass batch may be heated to a temperature between the melt temperature and the temperature in which the crystalline silica converts to amorphous silica. As previously described, the melt temperature and the temperature at which the crystalline silica converts to amorphous silica will depend on the composition of the glass batch. In such embodiments, the glass batch may be heated to a temperature below the gob temperature. In certain batch embodiments, the glass batch may be heated to similar temperatures. In certain embodiments, the process does not comprise refining the molten glass batch to remove all gas bubbles. This process is necessary to produce clear glass containers or plate glass but may not be necessary to produce amorphous silica sand, gravel, and other particles.

Alternatively, a further embodiment of the process comprises heating granules, grains, or particles of sand or rock comprising crystalline silica individually in combination with the other steps described herein. In further embodiments, the furnace may be a rotating kiln furnace.

The effluent of the furnace may be a ribbon of molten amorphous silica.

Cooling the Furnace Effluent

Embodiments of the method of the invention comprise cooling the ribbon effluent from the furnace. Therefore, a method may comprise cooling or allowing the amorphous mass cool to a hardened state. In some embodiments, the process may comprise rapidly cooling or quenching the ribbon of furnace effluent such as by fritting. Fritting of the molten glass causes a thermal gradient and violent fracturing of the solidifying amorphous material. The quenching of the molten glass may be performed by contact with a fluid such as water. The molten glass ribbon may overflow the furnace into a bath of fluid or the fluid may be spraying of the molten glass.

The solidified solid is an amorphous silica product. The fracturing of the glass results in small particles that may be classified into particle size ranges. The various particle size ranges may find application in the products described herein.

Embodiments of the method may further comprise crushing or otherwise comminuting at least a portion of the amorphous silica to particles to a smaller size or to narrow the particle size distribution. The desired particle size distribution may be the appropriate particle size distribution for abrasive blasting, use in mortar, plaster, concrete, and asphalt paving, foundry sand, and/or the production of bricks, for example.

Optionally, an embodiment of the process may comprise annealing fractured amorphous silica particle or the crushed or otherwise comminuted amorphous mass.

The molten glass batch exits the refractory through a weir. The weir is designed to provide an evenly shaped flow of molten glass for quenching. The furnace may have more than one weir to ensure proper molten glass ribbon shape and size for efficient quenching and fracturing of the solidifying amorphous silica.

In certain embodiments, quenching the molten amorphous mass should be performed properly to ensure fracturing of the amorphous solid upon rapid cooling. Ideally, the quenched amorphous solid comprises a particulate product having a desired particle size range, average particle size, and/or particle size distribution. The furnace effluent flow rate and shape may be controlled to provide uniform quenching of the amorphous silica.

Applications and Products

An embodiment of a process consists essentially of transforming crystalline or polycrystalline sand, grains, particles, or rock into amorphous sand, gravel or other particles for the purpose of rendering the material substantially free of crystalline silica (a known carcinogen) making it a safe replacement for naturally occurring products containing various forms of crystalline silica in consumer and industrial applications through a process comprising heating the crystalline or polycrystalline sand, grains, particles or rock into an amorphous mass and reducing the size of the amorphous mass for use in the desired application.

Still further embodiments of the process may comprise using amorphous sand for applications that currently of previously used crystalline or polycrystalline sand products including, but not limited to silica sand product applications and crushed rock products.

The amorphous sand produced by this process are especially useful for processes that produce airborne sand products such as for abrasive blasting or products that will be cut such as cement blocks, pavers, or bricks to avoid producing a potentially dangerous dust if crystalline silica sand was used.

Products and applications for the amorphous silica particles include but are not limited to, crystalline silica free amorphous silica sand, crystalline silica free amorphous silica gravel, crystalline silica free amorphous cullet, amorphous silica blasting material, crystalline silica free concrete, grout, manufactured stone, pavers, or mortar, concrete blocks made from crystalline silica free concrete, crystalline silica free bricks comprising crystalline free amorphous silica. For example, the bricks may comprise crystalline silica free sand in a concentration from 50% to 60% by weight, alumina in a concentration from 20% to 30% by weight, and lime in a concentration from 2 to 5% by weight.

The amorphous silica of the invention may be used as water insoluble or water soluble sand and blasting media.

Unlike recycled glass products, the amorphous silica sand produced by the method of the invention will comprise no trace fecal matter, no trace ferrous matter (unless intentionally added), no trace nonferrous metals, no trace stone or ceramic, and/or no trace pathogens. These substances are found in all recycled glass products.

Another embodiment of the method of the present invention to directly create a glass cullet that is free from contaminants. Glass production facilities add crushed recycled glass cullet into the new glass production process to reduce the heat required to melt the silica sand and the melt temperature of the silica sand. The problem with this glass cullet is that it may include contaminants from the glass recycle process. An embodiment of the method of the present invention is to produce clean glass cullet directly from crystalline silica sand. This "pre-reacted" batch material that can be added to batch glass (much as glass cullet is used today) that will lower the melt temperature of batch glass.

The amorphous silica sand, gravel, or other particles may be used in the manufacture of many products. For example, crystalline free silica foam glass and ceramics may be produced. An embodiment of the method for production of crystalline free foamed glass may comprise blending fine amorphous silica sand or ground amorphous silica sand with a blowing agent to form a foam glass precursor. The blowing agent may be any compound that produces an off-gas during heating at furnace temperatures. The blowing agent may be, but is not limited to, carbon or limestone, for example.

The method may further comprise heating the foam glass precursor in the furnace to cause the blowing agents to out-gas, thus expanding or foaming the molten mass. The molten mass is cooled and annealed to freeze the gas pockets creating a lightweight product. Foamed glass in the melted state can be formed into many products including insulation, blocks, brick, or aggregate for construction or agriculture.

The new "virgin" amorphous silica glass cullet product would compete directly with recycled glass cullet. The advantage of the embodied "pre-reacted" batch material would be it would be 100% free of deleterious materials such as rock, ceramic, metals, or lead that cullet producers go, to a lot of work to ensure don't get into their cullet in excessive quantities.

As used herein, the term "no trace" means that the component is below measurement limits of instruments typically used to determine the concentration of the component.

As used herein, "amorphous silica sand" means a silica product comprising less than 2 wt. % of crystalline silica in a primarily amorphous silica product, in a more specific embodiment, "amorphous silica sand" means a silica product comprising less than 1 wt. % of crystalline silica in a primarily amorphous silica product; and in an even more specific embodiment for blasting products, for example, "amorphous silica sand" means a silica product comprising less than 0.5 wt. % of crystalline silica in a primarily amorphous silica product.

Stabilizers may be added to the glass batch to reduce the water solubility of the resultant amorphous silica products. Stabilizers include, but are not limited to, calcium carbonate (lime), for example. Other components that may be mixed with the crystalline silica to produce the glass batch include a number of metal oxides to produce desired properties in the amorphous silica products. For example, alumina ($Al_2O_3$) may be added to the glass batch to provide increased durability of the amorphous silica products produced from the glass batch. Boron oxide ($B_2O_3$) may be a glass former like silica and increases the chemical resistance of the glass.

The melting point reducing agents may include, but is not limited to, sodium carbonate, sodium nitrate, iron oxide, iron silicates, potash, potassium carbonate, calcium carbonate, colemanite, sodium oxide, calcium oxide, magnesia, alumina, aluminum oxides, alumina silicates, lead oxide, alkali metals, lithium, sodium, potassium, rubidium, cesium, francium, and combinations thereof.

Additional fluxes may include materials such as naturally occurring products that contain these reducing agents such as, but not limited to, feldspar, alumina silicates comprising iron, bauxite, clays, ball clays, Kentucky or Tennessee clay, and kaolin, for example. Clay may be a finely-grained natural rock or soil material that combines one or more clay minerals with possible traces of quartz ($SiO_2$), metal oxides ($Al_2O_3$, MgO etc.) and organic matter. Ball clays are typically kaolinitic sedimentary clays that commonly consist of 20-80% kaolinite, 10-25% mica, 6-65% quartz. Another flux may be bauxite.

For example, sodium carbonate and potassium carbonate may lower the melting point of crystalline silica to about 1,000° C. (1830° F.) in certain concentrations and may be added to make the melting process more efficient.

Sodium carbonate increases the viscosity of the glass melt at a given temperature but is relatively expensive. Additionally, mixing sodium carbonate into the crystalline silica glass batch (and/or another melting point reducing agent), without the addition of a stabilizing agent such as, but not limited to lime, may cause the amorphous silica products to be at least slightly water soluble. Water soluble amorphous silica products may be more environmentally friendly that insoluble amorphous silica. Thus, a method of producing a water-soluble amorphous silica sand, gravel, or other particles comprises mixing a temperature reducing agent with crystalline silica without the addition of a stabilizer such as calcium carbonate and melting the batch glass to produce an amorphous silica product to be water soluble.

Density and Hardness Affecting Components

Embodiment of the amorphous silica products may comprise metals or metal oxides. These metals and metal oxides include refractory metals, iron, titanium, vanadium, chromium, manganese, zirconium, zircon, niobium, molybdenum, ruthenium, rhodium, hafnium, tantalum, tungsten, rhenium, osmium, iridium, and oxides or silicates of these metals, for example.

Additional metals include aluminum, aluminum oxides, aluminum silicates. The alumina may be from clay and, in some embodiments, low alkali clay. Some clays are up to 10% alumina Embodiments of the amorphous silica products may comprise components that change the hardness of the resultant amorphous silica products. Alkalis and lead oxides will decrease hardness in the resultant amorphous product, whereas addition of CaO, MgO, ZnO, $Al_2O_3$, $B_2O_3$, zirconium, zircon, zirconium oxides, iron and iron oxides will result in amorphous silica products with greater hardness.

EXAMPLES

Cullet was obtained from a glass recycling facility. The composition of the cullet was approximately as follows:

| Typical Cullet Composition | |
|---|---|
| $SiO_2$ | 74. wt. % |
| MgO | 0.3 wt. % |
| CaO | 11.3 wt. % |
| NaO | 13 wt. % |
| $K_2O$ | 0.2 wt. % |
| $Al_2O_3$ | 0.7 wt. % |
| $Fe_2O_3$ | 0.01 wt. % |

In embodiments of the glass formulations, the silicon oxides may be added in the form of cullet, sand, other sources of silicon oxides, or combinations thereof.

The melts were performed in a [Make and Model of Furnace]

Example 1

A melt batch (Sample 2789) was prepared comprising the following composition, silica dioxide ($SiO_2$) at 85 wt. %, sodium oxide (NaO) at 14 wt. %, and iron oxide ($Fe_2O_3$) at 1 wt. % in the melt batch.

The melt batch was melted in a crucible in a batch furnace at approximately 1525° C. The melted batch was then quenched in water. The solidified glass was sent for analysis for specific gravity and hardness. The specific gravity was determined to be 2.25. The Knoop hardness was determined to be 481.8.

Example 2

A melt batch (Sample 2790) was prepared comprising the following composition, silica dioxide ($SiO_2$) at 84 wt. %, zirconium oxide (ZrO) at 13 wt. %, sodium oxide (NaO) at 1 wt. %, and iron oxide ($Fe_2O_3$) at 2 wt. % in the melt batch.

The melt batch was melted in a crucible in a batch furnace at approximately 1550° C. The melted batch was then quenched in water. The solidified glass was sent for analysis for specific gravity and hardness. The specific gravity was determined to be 2.36. The Knoop hardness was determined to be 493.7.

Example 3

A melt batch (Sample 2791) was prepared comprising the following composition, silica dioxide ($SiO_2$) at 83 wt. %, zirconium oxide (ZrO) at 2 wt. %, sodium oxide (NaO) at 10 wt. %, and iron oxide ($Fe_2O_3$) at 5 wt. % in the melt batch.

The melt batch was melted in a crucible in a batch furnace at approximately 1575° C. The melted batch was then quenched in water. The solidified glass was sent for analysis for specific gravity and hardness. The specific gravity was determined to be 2.35. The Knoop hardness was determined to be 540.6.

Example 4

A melt batch (Sample 2792) was prepared comprising the following composition, silica dioxide ($SiO_2$) at 80 wt. %, zirconium oxide (ZrO) at 5 wt. %, sodium oxide (NaO) at 5 wt. %, and iron oxide ($Fe_2O_3$) at 10 wt. % in the melt batch.

The melt batch was melted in a crucible in a batch furnace at approximately 1625° C. The melted batch was then quenched in water. The solidified glass was sent for analysis for specific gravity and hardness. The specific gravity was determined to be 2.86. The Knoop hardness was determined to be 638.4.

Example 5

A melt batch (Sample 2799) was prepared comprising the following composition, silica dioxide ($SiO_2$) at 70 wt. %, zirconium oxide (ZrO) at 2 wt. %, sodium oxide (NaO) at 5 wt. %, aluminum oxide ($Al_2O_3$) at 3 wt. %, and iron oxide ($Fe_2O_3$) at 20 wt. % in the melt batch.

The melt batch was melted in a crucible in a batch furnace at approximately 1600 to 1625° C. The melted batch was then quenched in water. The solidified glass was sent for analysis for specific gravity and hardness. The specific gravity was determined to be 2.5. The Knoop hardness was determined to be 615.4.

Example 6

A melt batch (Sample 2800) was prepared comprising the following composition, silica dioxide ($SiO_2$) at 65 wt. %, zirconium oxide (ZrO) at 2 wt. %, sodium oxide (NaO) at 4 wt. %, aluminum oxide ($Al_2O_3$) at 6 wt. %, and iron oxide ($Fe_2O_3$) at 23 wt. % in the melt batch.

The melt batch was melted in a crucible in a batch furnace at approximately 1600 to 1625° C. The melted batch was then quenched in water. The solidified glass was sent for analysis for specific gravity and hardness. The specific gravity was determined to be 2.69. The Knoop hardness was determined to be 668.7.

Example 7: Melt Batch from Sand

A melt batch (Sample 2801) was prepared comprising the following composition, silica dioxide ($SiO_2$) at 60 wt. %, zirconium oxide (ZrO) at 2 wt. %, sodium oxide (NaO) at 3 wt. %, aluminum oxide ($Al_2O_3$) at 8 wt. %, and iron oxide ($Fe_2O_3$) at 27 wt. % in the melt batch.

The melt batch was melted in a crucible in a batch furnace at approximately 1600 to 1625° C. The melted batch was then quenched in water. The solidified glass was sent for analysis for specific gravity and hardness. The specific gravity was determined to be 2.52. The Knoop hardness was determined to be 721.9.

Example 8: Melt Batch from Cullet

A melt batch (Sample 2802) was prepared comprising the following composition, cullet (approximate composition above) at 90 wt. %, zirconium oxide (ZrO) at 2 wt. %, aluminum oxide ($Al_2O_3$) at 3 wt. %, and iron oxide ($Fe_2O_3$) at 5 wt. % in the melt batch.

The melt batch was melted in a crucible in a batch furnace at approximately 1600 to 1625° C. The melted batch was then quenched in water. The solidified glass was sent for analysis for specific gravity and hardness. The specific gravity was determined to be 2.50. The Knoop hardness was determined to be 622.

Example 9: Melt Batch from Cullet

A melt batch (Sample 2803) was prepared comprising the following composition, cullet (approximate composition above) at 80 wt. %, zirconium oxide (ZrO) at 3 wt. %, aluminum oxide ($Al_2O_3$) at 4.5 wt. %, and iron oxide ($Fe_2O_3$) at 12.5 wt. % in the melt batch.

The melt batch was melted in a crucible in a batch furnace at approximately 1600 to 1625° C. The melted batch was then quenched in water. The solidified glass was sent for analysis for specific gravity and hardness. The specific gravity was determined to be 2.54. The Knoop hardness was determined to be 651.9.

Example 10: Melt Batch from Cullet

A melt batch (Sample 2804) was prepared comprising the following composition, cullet (approximate composition above) at 70 wt. %, zirconium oxide (ZrO) at 4 wt. %, aluminum oxide ($Al_2O_3$) at 6 wt. %, and iron oxide ($Fe_2O_3$) at 20 wt. % in the melt batch.

The melt batch was melted in a crucible in a batch furnace at approximately 1600 to 1625° C. The melted batch was then quenched in water. The solidified glass was sent for analysis for specific gravity and hardness. The specific gravity was determined to be 2.71. The Knoop hardness was determined to be 654.8.

Example 11: Melt Batch from Sand

A melt batch (Sample 2809) was prepared comprising the following composition, silica dioxide ($SiO_2$) at 62.45 wt. %, magnesium oxide (MgO) at 0.3 wt. %, calcium oxide (CaO) at 0.2 wt. %, sodium oxide (NaO) at 7 wt. %, potassium oxide (KO) at 0.05 wt. %, and iron oxide ($Fe_2O_3$) at 30 wt. % in the melt batch.

The melt batch was melted in a crucible in a batch furnace at approximately YYYY° C. A portion of the melted batch was then quenched in water (Sample XXXXQ) and a portion of the melted batch was air cooled (Sample 2809A).

The solidified glass was sent for analysis for specific gravity and hardness. The specific gravity for Sample 2809Q was determined to be 2.534 and its Knoop hardness was determined to be 552.1.

The specific gravity for Sample 2809A was determined to be 2.864 and its Knoop hardness was determined to be 570.6.

Example 12: Melt Batch from Sand

A melt batch (Sample 2810) was prepared comprising the following composition, silica dioxide ($SiO_2$), at 57.45 wt. %, magnesium oxide (MgO) at 0.3 wt. %, calcium oxide (CaO) at 0.2 wt. %, sodium oxide (NaO) at 6.14 wt. %, potassium oxide (KO) at 0.05 wt. %, and iron oxide ($Fe_2O_3$) at 35 wt. % in the melt batch.

The melt batch was melted in a crucible in a batch furnace at approximately YYYY° C. A portion of the melted batch was then quenched in water (Sample 2810Q) and a portion of the melted batch was air cooled (Sample 2810A).

The solidified glass was sent for analysis for specific gravity and hardness. The specific gravity for Sample 2810Q was determined to be 2.858 and its Knoop hardness was determined to be 580.8.

The specific gravity for Sample 2810A was determined to be 2.826 and its Knoop hardness was determined to be 586.4.

Example 12

A melt batch may be prepared comprising the following composition, silica dioxide ($SiO_2$) at 42.3 wt. %, magnesium oxide (MgO) at 0.3 wt. %, calcium oxide (CaO) at 0.2 wt. %, sodium oxide (NaO) at 6.14 wt. %, wt. %, and iron oxide ($Fe_2O_3$) at 50 wt. % in the melt batch.

The embodiments of the described amorphous silica products and method are not limited to the particular embodiments, components, method steps, and materials disclosed herein as such components, process steps, and materials may vary. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be affected within the scope of the invention as defined in the appended claims. Accordingly, the scope of the various embodiments of the present invention should not be limited to the above discussed embodiments and should only be defined by the following claims and all equivalents.

The invention claimed is:

1. An abrasive blasting media, comprising:
   silicon oxide in the range of 50 wt. % to 75 wt. %;
   iron oxides in the range of 20 wt. % to 45 wt. %; and
   fluxing compounds in the range of 0 to 25 wt. %, wherein the abrasive blasting media has a density between 2.5 g/cc and 3.5 g/cc; and
   aluminum oxides in the range of 0.5 wt.% to 10 wt.%, wherein the abrasive blasting media are particles having a particle size range wherein: greater than 80% of the particles are in a size range from 425 microns to 2000 microns.

2. The abrasive blasting media of claim 1, comprising zirconium oxides in the range of 0.5 wt. % to 10 wt. %.

3. The abrasive blasting media of claim 1, wherein the fluxing compounds are selected from the group comprising sodium oxides, calcium oxides, magnesium oxides, potassium oxides, lithium oxides, boric oxides, and combinations thereof.

4. The abrasive blasting media of claim 1, wherein the ratio of Si to Fe in the abrasive blasting media is in the range of 3:4 to 4:1.

5. The abrasive blasting media of claim 1, wherein the ratio of Si to Fe in the abrasive blasting media is in the range of 3:4 to 3:1.

6. The abrasive blasting media of claim 1, wherein the Iron oxides are in the range of 20 wt. % to 30 wt. %.

7. The abrasive blasting media of claim 6, wherein the fluxing compounds comprise sodium oxide and are in the range of 2 wt. % to 10 wt.% of the abrasive blasting media.

8. The abrasive blasting media of claim 1, wherein the fluxing compounds are selected from the group comprising sodium oxides, calcium oxides, magnesium oxides, potassium oxides, lithium oxides, boric oxides, and combinations thereof.

9. The abrasive blasting media of claim 1, wherein the iron oxides are in the range of 18wt.% to 30 wt.% and the silicon oxides are in the range of 55 wt.% to 80 wt. %.

10. An abrasive blasting media, consisting essentially of:
    silicon oxide in the range of 50 wt.% to 70 wt.%;
    iron oxides in the range of 18 wt.% to 30 wt.%;
    a combination of aluminum oxides and zirconium oxides in the range of 3 wt.% to 15 wt.%; and
    fluxing compounds in the range of 1 wt.% to 14 wt.%, wherein the abrasive blasting media has a density between 2.5 g/cc and 3.5 g/cc, wherein the abrasive blasting media are particles having a particle size range wherein: greater than 80% of the particles are in a size range from 425 microns to 2000 microns.

11. The abrasive blasting media of claim 10, wherein a combination of aluminum oxides and zirconium oxides in the range of 4 wt. % to 11 wt.%.

12. The abrasive blasting media of claim 11, wherein the abrasive blasting media has a Knoop hardness greater than 630.

13. The abrasive blasting media of claim 11, wherein the abrasive blasting media has a Knoop hardness greater than 650.

14. The abrasive blasting media of claim 11, wherein the zirconium oxide is less than 3 wt.%.

15. An abrasive blasting media, consisting essentially of:
    silicon oxide in the range of 50 wt.% to 70 wt.%;
    iron oxides in the range of 18 wt.% to 30 wt.%;

a combination of aluminum oxides and zirconium oxides in the range of 3 wt.% to 15 wt.%; and fluxing compounds in the range of 1 wt.% to 14 wt.%, wherein the abrasive blasting media has a density greater than 2.8 g/cc and less than 3.5 g/cc.

* * * * *